May 19, 1925. Re. 16,076
M. L. CROUCH
SOAP MOLDING MACHINE
Original Filed Aug. 31, 1917 2 Sheets-Sheet 1
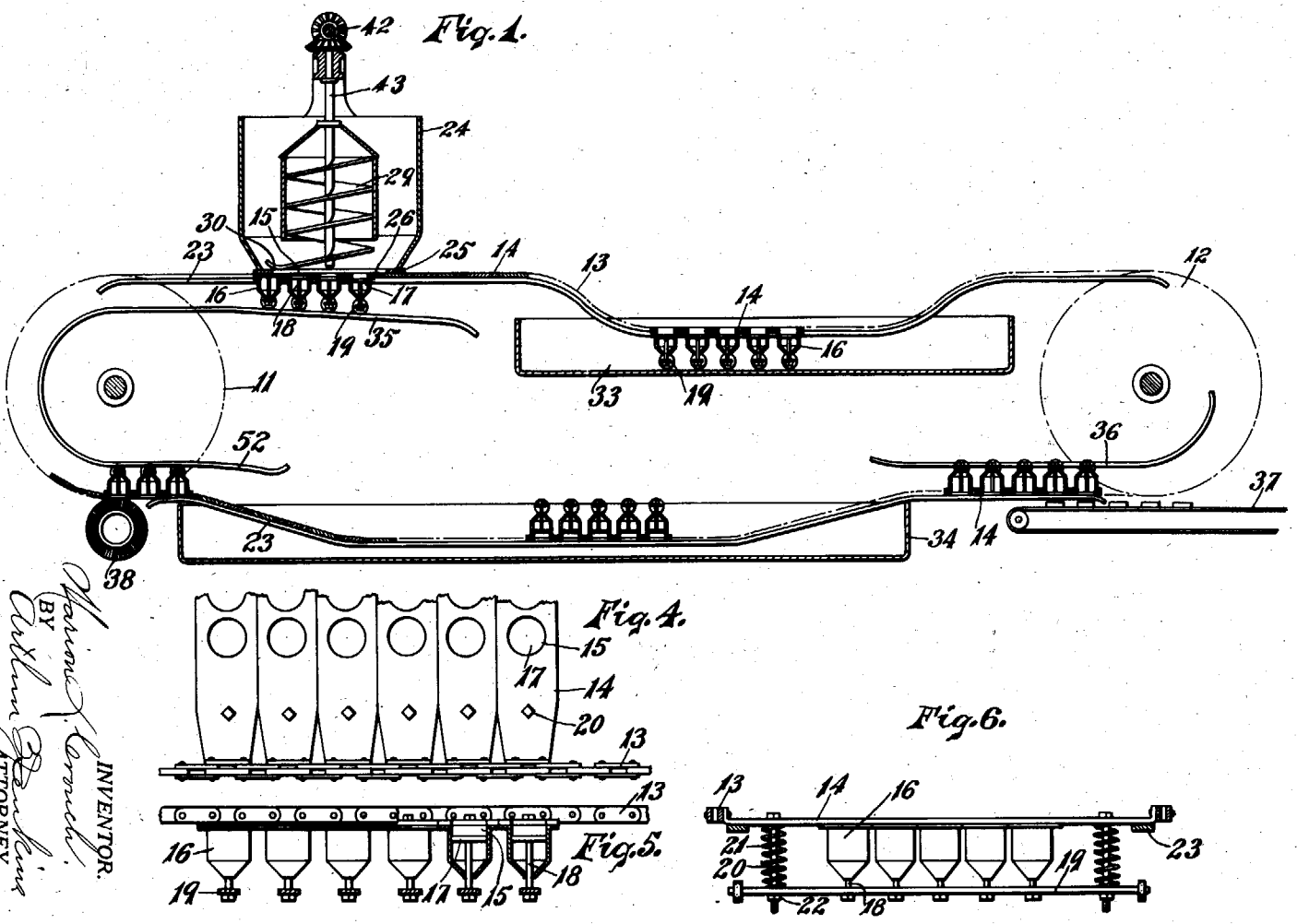
INVENTOR.
Marion L. Crouch.
BY
Arthur Jenkins
ATTORNEY May 19, 1925. Re. 16,076

M. L. CROUCH

SOAP MOLDING MACHINE

Original Filed Aug. 31, 1917 2 Sheets-Sheet 2

INVENTOR.
Marion L. Crouch.
BY
Arthur Hopkins,
ATTORNEY

Reissued May 19, 1925. Re. 16,076

UNITED STATES PATENT OFFICE.

MARION L. CROUCH, OF MILWAUKEE, WISCONSIN.

SOAP-MOLDING MACHINE.

Original No. 1,308,753, dated July 8, 1919, Serial No. 189,099, filed August 31, 1917. Application for reissue filed March 29, 1921. Serial No. 456,662.

*To all whom it may concern:*

Be it known that I, MARION L. CROUCH, a citizen of the United States, residing at Milwaukee, in the county of Milwaukee and State of Wisconsin, have invented a new and Improved Soap-Molding Machine, of which the following is a specification.

My invention relates to a machine for forming cakes or bars of soap, and an object of my invention, among others, is to provide such a machine with means for mechanically taking the several steps required to form a cake or bar of soap in a rapid, efficient and economic manner.

A form of machine embodying my invention and in the construction and use of which the objects herein set out, as well as others, may be attained, is illustrated in the accompanying drawings, in which—

Figure 1 is a diagrammatic view illustrating the relative disposition of the parts of my improved machine when viewed in lengthwise section.

Figure 4 is a detail view, scale enlarged, illustrating the construction of the mold plates and their attachment to the carrier chain.

Figure 5 is an edge view of the same.

Figure 6 is a view in section through the carrier chain illustrating the arrangement of the mold plates and the follower operating bar, the scale being the same as that of Figures 4 and 5.

Figure 3:
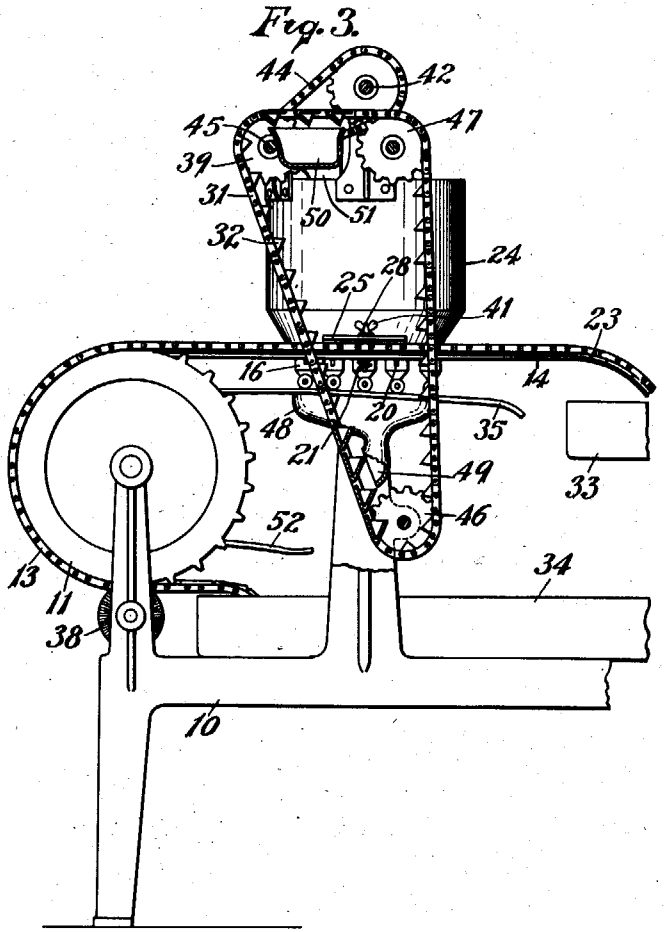
Figure 3 is a view in side elevation and in section on a plane passing through the waste carrier.

In the accompanying drawings the numeral 10 indicates generally the frame of my improved machine which includes legs, side bars, cross bars and other suitable supporting elements arranged in any suitable manner and secured together to form a rigid structure to support the soap making devices.

Carrier supporting wheels 11—12 are mounted upon opposite sides of the frame at or near one end thereof, these wheels preferably having teeth to receive endless chains 13 supported upon the wheels. These chains constitute a part of a carrier that also includes mold plates 14 secured at each end to the chain with their edges in contact, each mold plate having a series of openings 15 extending lengthwise of the plate and spaced a suitable distance apart. A set of molds 16 are secured to each plate underneath said openings, these molds being preferably composed of thin material, and they are spaced a slight distance apart to permit presence of a fluid between them. The interior dimension of each mold is substantially that of the opening 15 through the plate into it, and each mold has a follower 17 closely fitting its interior, each follower having a stem 18 projecting through the bottom of the mold. The openings 15 through the plates may be of any desired shape to correspond to the shape of the cakes to be produced, the cross sectional shape of the interior of the molds, of course, being made to correspond to the shape of said openings.

The molds are arranged in sets, each set extending across the carrier, in the arrangement shown herein five molds comprising each set, and a follower operating bar 19 is provided to which the end of each stem 18 in each set is preferably attached, said stems being attached to the bars in any suitable manner. A follower bar supporting post 20 projects from the under side of each plate, preferably at or near each end, and these posts have springs 21 thrusting against the under side of the mold plate and against said bar, and a gage 22 may be adjustably secured to each post to determine the position of the follower operating bar for the size, in thickness, of the cake of soap to be produced. In the construction herein shown this gage 22 consists of a nut screw threaded onto each post underneath the follower operating bar. Any other means for determining this size in thickness of the cake may be employed. In some forms of construction the mold plates and molds may be composed of a single piece of sheet metal stamped to proper shape.

The chains 13 may be of any suitable form to receive the teeth of the supporting wheels and to permit the mold plates to be secured in place, and the driving power is applied to drive the shaft to which the wheels 11 are secured, this method of applying the power to rotate the wheels in the direction to cause the upper reach of the chain to move to the right as seen in Figure 3 causing the plates to be moved by a pushing action, especially at this end of the carrier and where they receive their contents, and the edges of the plates are thus maintained in close contact so that the leakage of soap from the crutcher between the plates is lessened. A carrier guide and support 23 extends along the machine upon opposite sides thereof in position to support and guide the carrier in its movements, as shown herein the mold plates sliding along the outer surface of this guide both on the top and bottom "reaches" of the chain. A crutcher 24 of any desired form and construction, or any other suitable supply tank, is placed upon a crutcher plate 25 supported on the machine frame and just in front of the supporting wheels 11, this plate having an opening 26, preferably of a width to uncover several of the mold plates, the structure in fact constituting a crutcher with a bottom having an opening therein, which bottom may be omitted if desired. The carrier supports 23 are carried upon pivotally mounted guide arms 40, and are adjustable vertically as by means of screw rods 28 supporting said arms and passing through the plate 25 and having thumb nuts 41 at their outer ends. This enables the mold plates to be pressed into close contact with the plate 25 or bottom edge of the crutcher, to lessen or avoid leaking of the crutcher between its under surface and the moving mold plates. A feed worm 29 of usual construction may be located within the crutcher and is driven in a manner common to devices of this class. I have, however, provided the lower end of this worm with a smoothing and packing shoe 30 positioned to wipe across the upper surface of the mold plates and across the mouth of the molds to press and pack the contents solidly therein. A waste carrier including a waste belt 31 with pockets 32 is arranged to travel vertically and around waste carrier supports rotatably mounted, this carrier being arranged in any suitable manner and driven as by power from a shaft 42 mounted upon the crutcher and connected as by bevel gears to drive the crutcher shaft 43. A shaft 45 bears one of said supports 39 and is connected as by a sprocket chain 44 with the waste carrier driving shaft 42. The waste carrier comprises a pair of chains connected by the pockets 32, each of the waste carrier supports 39, 46 and 47 consisting of a pair of sprocket wheels mounted to support each chain and relatively arranged as shown in Figure 3 of the drawings.

Figure 2:
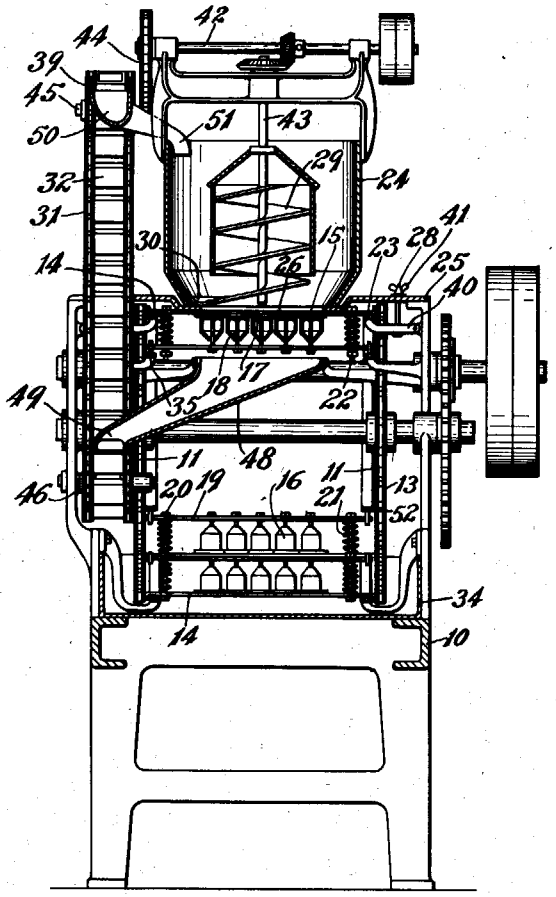
Figure 2 is a view in vertical cross section on plane passing generally through the center of the crutcher, parts beyond being omitted.

A receiver 48 is located underneath the crutcher and is of a size to receive the waste material that passes through between the mold plates 14 or that may otherwise appear underneath said plates as the molds are filled. This receiver terminates in the form of a spout 49 that delivers the waste material into the pockets 32 and as shown in Figures 2 and 3 of the drawings. Another receiver 50 with an outlet 51 is located to deliver into the top of the crutcher and in position to receive the contents of the pockets 32 that are dumped into said receiver and delivered through the outlet 51 into the crutcher and as shown in Figure 2 of the drawings.

A cooling tank 33 is supported by the frame a short distance from the crutcher and the carrier guides extend downwardly at one end of the tank and then upwardly at the opposite end thereof to guide the mold plates and molds and immerse them in a cooling fluid contained within the tank. The disposition of the molds with spaces between them and the thin character of the walls will enable the contents to be thoroughly cooled and hardened as the molds pass through this tank. Another tank 34 is supported by the frame to receive a part of the lower "reach" of the carrier, the guides 23 being arranged in a manner similar to that above described, to conduct the mold plates and molds into the hot fluid contents of this heating tank which receives the molds after the cakes of soap have been removed therefrom, the heating medium softening any material that may have been retained within the molds and thus enabling the latter to be readily cleaned.

Follower bar operating guides 35 are arranged along each side of the frame to receive the ends of the follower bars, these guides being so arranged at a point near the crutcher that the bars will be operated to force the followers into the mouth of the openings 15 and flush with the outer surface of the mold plates at or about the time the mold plates pass forward underneath the crutcher and under the front edge of the opening 26. The arrangement of these guides is such at this point that the followers are gradually moved downwardly in the mold to the bottom thereof, at about the same rate as that of filling of the mold, the lowermost position being reached before the molds have passed from underneath the openings 26. This arrangement presents the molds underneath the opening 26 substantially free from air, the downward movement of the follower being such as to permit the contents to keep the space in the mold filled as the follower moves down. After the molds are filled the springs 21 will operate to retain the followers in this position until after the molds have passed through the cooling tank 33 and preferably around the wheels 12. The carrier guide support 23 may be dispensed with at that part of movement of the carrier around the wheels 11 and 12, and arranged to again engage with the mold plates at or before the carrier leaves the supporting wheels. The carrier guides and supports are arranged within the loop formed by the carrier at the upper "reach" thereof and outside of said loop at the lower "reach".

At a point in the travel of the carrier after it leaves the wheels 12, the follower bar operating guides are arranged as at 36 to move the followers to the mouth of the molds to eject the cakes of soap therefrom, the molds at this time being upside down and the cakes preferably being delivered on to an apron or belt 37 that may be driven in any suitable manner to carry the molded cakes to a special drier or any other desired point. After the cakes are ejected the springs 21 operate to draw the followers into the molds in which condition the latter are passed through the heating tank 34 and any material that may have adhered to the walls of the molds is softened, so that as the followers are again forced to the mouth of the molds, as by the guides 52 arranged to do this at or about the time the molds leave the heating tank, this material will be easily removed and scraped from the interior walls of the molds by the followers. After leaving the heating tank and while the followers are thus at the mouth of the molds, they pass across a cleaning wheel 38 which has its outer surface preferably composed of bristles of any suitable character, this wheel being rotated in any desired manner to cause all waste material to be removed from the follower and the outer surface of the mold plates, said parts being thus thoroughly cleaned.

The followers may be maintained by the guides in this position until they again pass under the crutcher, as hereinbefore described, or the guides 35 may be arranged to cause the followers to be thrust into the mouths of the molds only at about the time they pass underneath the crutcher in the manner as hereinbefore described.

In accordance with the provisions of the patent statutes, I have described the principles of operation of my invention, herein, but it will be understood that the device shown is only illustrative, and that the invention can be carried out by other means.

I claim:

1. A mold structure for a soap making machine comprising a plate, a plurality of closed molds projecting from one face of said plate and spaced apart to freely expose their adjacent surfaces on different sides thereof and freely admit a cooling liquid to all sides thereof, and a liquid cooling tank to receive said molds.

2. A frame, a carrier supported for traveling movement thereon, a mold plate secured to the carrier, a plurality of molds projecting from one face of said plate, plungers located in said molds, an operating bar connected with all of said plungers, and means for actuating said bar at opposite ends thereof to position the plungers.

3. A frame, a carrier supported for traveling movement thereon, a series of mold plates secured to said carrier and located close together, molds supported by said plates, a receptacle for supplying material to said molds, and means for applying power to said chain at a point to cause said plates to be pushed one against the other as they pass underneath said receptacle.

4. A frame, a carrier supported for traveling movement thereon, molds secured to the carrier, a receptacle located above the path of said molds, screw rods supported by the frame, guide rests supported by said rods in position to be pressed against the carrier, means for operating the rods to press the rests against the carrier, and means for operating the carrier.

5. A frame, a carrier supported for traveling movement thereon and including flexible members, a mold plate extending between said members, molds secured to said plate, a receptacle located above the path of said molds, means for operating the carrier, and means located and operated to wipe across the mouths of said molds in a horizontal direction to smooth the material thereat.

6. A frame, a carrier supported for traveling movement thereon, mold plates secured to the carrier, molds secured to said plate, a receptacle located above the path of said molds, means for operating the carrier, and means for conducting waste material from underneath the carrier to a point above said receptacle.

7. A frame, a carrier supported for traveling movement thereon, a mold plate secured to said carrier and having molds, a receptacle located above the path of said molds, a plurality of tanks for subjecting the molds to degrees of temperature on opposite sides of the normal degree of temperature of said molds, and means for guiding said molds into and out of said tanks.

8. A frame, a carrier supported for traveling movement thereon, a mold plate secured to the carrier and having molds thereon, a receptacle located to supply material to said molds, a tank to receive a medium to change the temperature of the molds, followers located within the molds, means for guiding the molds into the tank, and means for changing the position of the followers with respect to said molds for action of the contents of the tank.

9. A frame, a carrier supported for traveling movement thereon, a mold plate having molds secured to said carrier, a receptacle to supply material to said molds, followers located within the molds, a tank for changing the temperature of the molds, means for guiding the molds into said tank, means for maintaining the position of the followers while in said tank, a second tank for changing the temperature of the molds, and means for changing the position of the followers with respect to said second tank.

10. A frame, a carrier supported for traveling movement thereon, a mold plate having molds secured to said carrier, a receptacle to supply material to said molds, followers located within the molds, a tank for changing the temperature of the molds, means for guiding the molds into said tank, means for subsequently changing the position of the followers to eject cakes from the molds, a second tank for changing the temperature of the molds, means for guiding the molds into said tank, and means for withdrawing the followers from their ejecting position for passage through the second tank.

11. A frame, a carrier supported for traveling movement thereon and including flexible members, a mold plate extending between said members, a receptacle located above the path of said molds, a tank to receive a cooling medium, means for conducting the molds into said tank, a tank to receive a heating medium, means to conduct molds into said heating medium, followers located within the molds, guides connected with the followers to operate them to eject cakes therefrom between said tanks, to move the followers to the bottom of the molds while in the heating medium, to move the followers to the mouth of the molds for delivery underneath said receptacle, and a cleaning device to engage the molds after delivery from the heating medium.

12. A frame, a carrier supported for traveling movement thereon, a mold plate having molds secured thereto, a receptacle to supply material to said molds, a plurality of tanks positioned along the line of travel of said carrier, guides positioned along the line of travel of said carrier to support the mold plate at predetermined intervals, followers arranged within the molds, a follower operating bar secured to the followers, and guides arranged at intervals along the path of travel of said carrier to receive said bar to place the followers in different positions along the line of travel of said carrier.

13. A mold plate and a supply device relatively movable to pass one across the other, a mold depending from the under surface of said plate and with a mouth opening through the upper surface of the plate to receive plastic material from said supply device, and means for subjecting the entire outer surface of the mold to the action of a hardening medium of substantially uniform temperature as to that portion in contact with the mold.

MARION L. CROUCH.